United States Patent [19] [11] 3,953,642
Forbess et al. [45] Apr. 27, 1976

[54] PRESSURE SENSITIVE RECORDING SHEET

[75] Inventors: Dennis L. Forbess; John E. Hanby, both of Vancouver, Wash.

[73] Assignee: Crown Zellerbach Corporation, Camas, Wash.

[22] Filed: Jan. 9, 1974

[21] Appl. No.: 432,066

[52] U.S. Cl. .............................. 428/204; 162/126; 162/127; 162/128; 162/129; 427/207; 427/219; 427/298

[51] Int. Cl.$^2$ .................... B32B 27/32; D21F 11/00

[58] Field of Search ........... 162/145, 126, 127, 128, 162/129; 161/6, 249, 250, 169, 160, 152, 172; 117/76 P, 1.5, 36.1; 260/94.9 F; 264/69; 428/298, 204, 207, 219; 427/144

[56] References Cited

UNITED STATES PATENTS

| | | | |
|---|---|---|---|
| 3,411,976 | 11/1968 | Heliker et al. | 161/6 |
| 3,501,369 | 3/1970 | Drelich et al. | 161/150 |
| 3,625,736 | 12/1971 | Matsukawa et al. | 117/36.2 |
| 3,752,732 | 8/1973 | Peterson et al. | 161/249 |
| 3,795,575 | 3/1974 | Gouw | 162/129 |

*Primary Examiner*—Mayer Weinblatt
*Assistant Examiner*—Edith R. Buffalow
*Attorney, Agent, or Firm*—Kolisch, Hartwell, Dickinson & Stuart

[57] ABSTRACT

A pressure sensitive recording sheet adapted for imaging under the pressure of a typewriter key or other writing instrument. The sheet comprises a ply of high surface area polyolefin fibers masking a colored medium therein. The ply of polyolefin fibers when subjected to the localized pressure of a writing instrument becomes relatively transparent in the region where the pressure is applied, to make distinct the colored medium distributed in the recording sheet.

9 Claims, 3 Drawing Figures

PRESSURE SENSITIVE RECORDING SHEET

Figure 1:
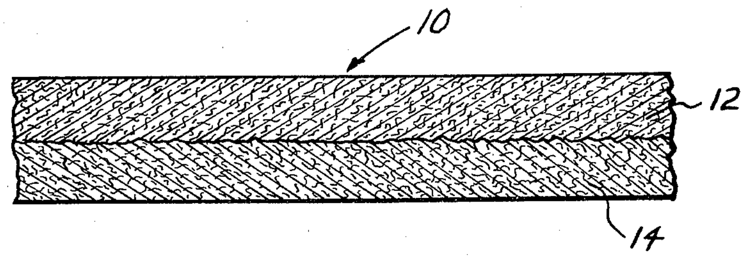

This invention relates to a pressure sensitive recording sheet adapted to produce a visible image when pressure is applied thereto in a localized region, as with a typewriter key, stylus, ball-point pen, pencil or other writing instrument. The recording sheet contemplated has particular utility as a copy sheet utilized in producing duplicate copies of an original typed on a typewriter. The sheets of the invention have the requisite flexibility to permit transmission of pressure, therethrough, as is necessary in the making of multiple copies with the typing of an original.

More specifically, this invention relates to a pressure sensitive recording sheet which includes a layered mat of high-surface area polyolefin fibers, which may be prepared with a paper making machine in much the same manner as the usual paper, i.e., by preparing a water suspension of the fibers and producing a layered deposit of the fibers on a screen or other perforate support surface with subsequent removal of water by draining or with the application of a vacuum. The fibers from which the mat is prepared have a relatively large surface area per measured weight, i.e., a surface area exceeding 1 $m^2$ per gm. These fibers, which are produceable according to a number of procedures known in the art, by reason of the multiplicity of light-scattering interfaces that result from the large surface area indicated, impart to the mat a high degree of opacity. With pressure applied to a localized region of such mat, the polyolefin fibers compact in the localized region of high pressure, with destruction of these light-scattering interfaces, and the production of a region of relative transparency. Such transparentization of the mat renders distinct a colored medium distributed in the recording sheet, which medium was obscured by the polyolefin fibers prior to compaction.

A number of important advantages attach to the recording sheet of the invention. For instance, recording sheets are produceable without the requirement of applying a pigmented or other specialized coating to a paper substrate. Thus, if desired, although not intended as a limitation of the invention, the recording sheet is produceable by a manufacturer employing only paper making machinery and not coating equipment. Recording sheets are produceable where the faces of the sheets have an appearance closely resembling the appearance of conventional paper sheets. Excellent imaging characteristics are obtained, with copy sheets being produceable effective with usual typewriter pressures to produce duplicate copies of up to 12 or more sheets with the making of an original. The sheets have good storage life, and are relatively insensitive to light, change in moisture conditions, etc. Sheets according to certain embodiments of the invention exhibit good offset printability, resistance to curl, etc.

A general object of the invention, therefore, is to provide a novel pressure sensitive recording sheet featuring a mat in the sheet made of compactible polyolefin fibers imparting opacity to the sheet, which opacity is transformed into transparency under the pressure applied by a writing instrument by reason of fiber compaction, rendering distinct regions of applied pressure.

A related object is to provide such a recording sheet which includes a colored medium distributed therein normally obscured by the opacity in the sheet, but made distinct upon the application of localized pressure and the relative transparency that such produces.

A more specific object is to provide a recording sheet which comprises at least a pair of fibrous plies, one of such plies comprising a normally relatively opaque fibrous mat of compactible polyolefin fibers having a relatively large surface area per unit weight, the other ply comprising a paper ply of cellulosic material, said other ply having a colored medium associated therewith.

In another embodiment of the invention, the recording sheet may comprise face and back plies applied to opposite sides of a central ply comprising compactible polyolefin fibers of large surface area, constructed to produce imaging under the pressure applied by a writing instrument by reason of fiber compaction in the central ply.

Figure 2:
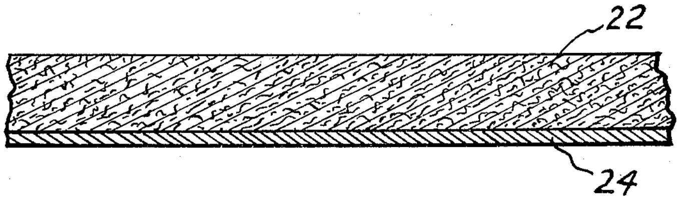
Figure 3:
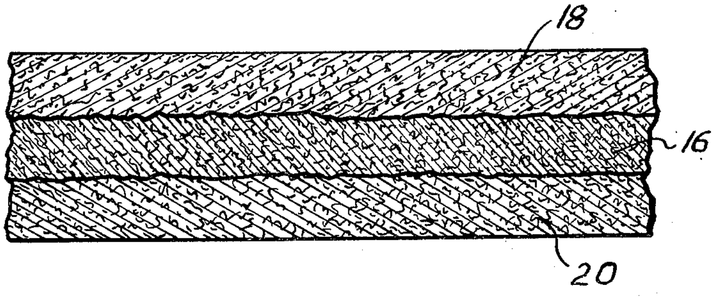

These and other objects and advantages of the invention will become more fully apparent, as the following description is read in conjunction with the accompanying drawings, wherein:

FIGS. 1, 2 and 3 are schematic cross-sectional views of recording sheets according to different embodiments of the invention.

Various types of pressure sensitive recording sheets, including what are sometimes referred to in the art as carbonless copy papers, have been proposed. Certain types of such sheets require heat for the production of an image which, of course, is unsatisfactory in a copy sheet intended for typewriter use where little if any discernible heat is generated under the impact of a typewriter key. Many recording sheets rely upon special coatings applied against a substrate, which are effective in selected regions under the action of heat and/or pressure to produce an image. Certain forms of sheets do not have the requisite flexibility to enable their convenient use in a typewriter. Furthermore, of course, when a coating is applied of a special nature, this complicates the manufacture of the paper product, requiring special attention to coating compositions and the utilization of coating equipment in the manufacture of the product.

A development in recent years is the manufacture of polyolefin fibers suitable for making paper on conventional paper making equipment. Such fibers have a morphology and other properties similar to natural cellulosic fibers. In particular, the fibers have a large surface area, typically greater than about 1 $m^2$ per gm, and up to about 150 $m^2$ per gm, as measured by gas absorption as described in the article by Stone and Wickerson appearing in "Pulp and Paper Magazine of Canada", 64, pp T155–T161 (1963). The fibers normally have a weight average length between 0.3 and 10 mm, as measured by TAPPI Test T232 SU 68, and a coarseness of between about 1 and 15 decigrex (mg/100 m), as measured by TAPPI Test 234 SU 67. The drainage factor of the fibers is typically between 0.2 and 25.0 seconds per gm as measured in accordance with TAPPI Test T221 OS 63.

Fibers having the large surface area indicated, and when prepared into a layered mat or web, impart to the mat a high degree of opacity. Such opacity is the result of the multiplicity of light-scattering interfaces which are present in the mat. When the pressure of a writing instrument is exerted against such a mat, and by reason of the plasticity of the fibers shared by polyolefins in general, compaction of the fibers results, with destruction of these light-scattering interfaces. With compaction, relative transparency is introduced, referred to herein as transparentization, which is relied upon in the recording sheet of the invention to reveal in a distinct way a colored medium distributed in the recording sheet which formally was obscured by the opacity of the mat.

High density polyethylene having a melt index of about 0.2 to 10, corresponding to a weight average molecular weight ranging from about 20,000 to about 300,000, is preferred for forming the fibers.

To form suitable paper from the fibers by conventional paper making techniques, it is desirable to employ an agent to impart water dispersibility to the fibers. These agents are preferably water-soluble or partially water-soluble polyhydroxylated, polymeric materials which are substantially nonfoaming in aqueous slurries at the concentrations employed. The amount of waterdispersing agent employed may range from about 0.2% to about 15% by weight preferably from about 0.1% to about 15% by weight, and most preferably between about 0.7% and about 2.5%. The preferred water-dispersing agent is a water-soluble polyvinyl alcohol having a degree of hydrolysis greater than about 77% and preferably greater than about 85%, and having a viscosity (in a 4% aqueous solution at 20°C.) greater than about 2 centipoises.

Reference is made to U.S. Pat. No. 3,743,272 for a description of a shear precipitation process for preparing compactible polyolefin fibers usable in the instant invention. The patent discloses a process where a solution is prepared of a polyolefin at a temperature above the melt dissolution temperature of the polyolefin. The solution prepared is dispersed in a precipitant, such as water, under high sheer conditions, with polyolefin fibers usable in the instant invention forming directly in the precipitant.

In another preparation described in West German OLS 2,117,370, compactible polyolefin fibers having a high surface area per measured weight are prepared by polymerizing an olefin in a solvent at a temperature above the melt dissolution temperature of the olefin. The reaction mass is then cooled to a temperature below the melt dissolution temperature, while imparting a minimum of sheer stress thereto, which produces a fibrous gel containing polyolefin microfibrils, macrofibrils, and fibers. The gel is then refined to produce the fibers desired.

Yet another process for preparing the polyolefin fibers, referred to as an emulsion process, is the subject matter of West German OLS 2,449,604. In this process a dispersion is formed of a polyolefin, a solvent for the polyolefin, water, and a polymeric water dispersing agent for the polyolefin fibers which form. The mixture prepared is at a temperature above the melt dissolution temperature of the polyolefin in the solvent, and at substantially autogeneous pressure. The mixture is passed through a nozzle into a zone of lower pressure, to form an aqueous slurry of fibrous polyolefin which is refined into a pulp of discrete fibers.

Another process for preparing polyolefin paper making fibers is described in West German OLS 2,227,021. In the process a solution of the polyolefin is passed into a region of reduced pressure where a portion of the solvent is vaporized and the polymer is precipitated as a swollen fibrous mass or gel, which is subjected to attritional forces to liberate individual, discrete fibers.

Referring to the drawings, illustrated in FIG. 1 in cross section is a recording sheet according to one embodiment of the invention. As shown in FIG. 1, the recording sheet 10 includes two plies designated 12 and 14, respectively. Ply 12 comprises a mat of compactible polyolefin fibers which may be prepared using usual paper making techniques from a water suspension of the fibers layered out on a screen or other support. Ply 14 comprises a ply of cellulosic fibers, i.e., wood pulp fibers, which also may be prepared on the usual paper making machine from a slurry of fibers, the ply or mat 14 being coextensive with ply or mat 12. In making the recording sheet, the layer of fibers forming ply 14 is formed against the layer of fibers comprising ply 12 while the two layers are still in a relatively moist state. The assembly is dried, and the two plies in the resultant sheet adhere to each other through interfiber bonding or entanglement produced by the drying operation.

The recording sheet pictured in FIG. 1 may have a colored medium distributed therein, as by dyeing the wood pulp fibers making up the ply 14. The color of the dyed wood fibers is at least partially obscured on the face of the recording sheet, which is the top side of the sheet as illustrated in FIG. 1, by the opacity of ply or mat 12. When the pressure of a writing instrument is applied to the face of the recording sheet, as exemplified by the pressure of a typewriter key transmitted through an original against the copy sheet, the fibers in ply 12 in the region where pressure is applied compact to render such region relatively transparent. By reason of such relative transparency, the color of the dyed fibers in ply 14 becomes distinct on the face of the recording sheet.

Considering another embodiment of the invention, and referring again to FIG. 1, a colored medium may be distributed in both layers by dyeing the wood pulp fibers in ply 14 and also dyeing the polyolefin fibers in ply 12. The dyes can be of either the same color or different colors. Pressure of the writing instrument causes compaction of the polyolefin fibers in ply 12 with resulting color intensification of ply 12 plus color show through from ply 14. This use of dyes in both plies will often produce a better image than with dye in ply 14 alone. Intensity of color in layer 12 may be less than the color intensity of layer 14.

Considering another embodiment of the invention, and referring to FIG. 3, the recording sheet illustrated comprises a center ply 16 in the form of a mat of compactible polyolefin fibers. Attached to opposite faces of the center ply are plies 18 and 20 forming the front and back sides, respectively, of the recording sheet. These plies may be made of the usual wood pulp fibers. Ply 18 is relatively thin, normally not having a basis weight, for instance, exceeding about 20 gms per $m^2$, but preferably less than about 10 gms per $m^2$. By reason of the relatively thin nature of this ply the ply possesses a low opacity even though the ply has a wood fiber composition.

Ply 16 of the recording sheet shown in FIG. 3 has a coloring medium distributed therein, as by dyeing the fibers. Additionally, if desired, the wood fibers of ply 20 may be dyed. In the recording sheet as manufactured and before use, the coloring of ply 16 is only faintly discernible from the front side of the sheet because of the masking effect of ply 18, and ply 16 masks almost entirely the coloring in ply 20.

When the pressure of a writing instrument is applied to the face of the copy sheet, in the region of applied pressure there is fiber compaction in ply 16 with such region becoming relatively transparent. This has the effect of intensifying in such region the color imparted to ply 16 by the dyed fibers therein. Furthermore, the transparent nature of this region in ply 16 makes distinct from the front face of the sheet what formally was obscured by the opacity of ply 16; namely, the coloration of ply 20.

All of the embodiments of the invention discussed above may be produced using conventional paper making machinery, and without need to resort to use of coating apparatus. The embodiments of the invention pictured in FIGS. 1 and 3 are particularly suited for manufacture using a so-called cylinder-type paper machine, which can be operated to produce multiple layer deposits of fiber continuously on a cylinder support surface as the cylinder surface is moved successively first through a zone containing a slurry of one type of fiber and then through a zone or zones containing a slurry or slurries of other types of fibers. The recording sheets may also be prepared in other types of paper making machinery capable of making a multiple ply sheet.

FIG. 2 illustrates another embodiment of the invention, where the colored medium made distinct by the application by pressure resides in a coating applied to a side of a mat or ply in the recording sheet. Thus, and referring to FIG. 2, the recording sheet includes a ply 22 made up of a mat of compactible polyolefin fibers which has coated on the back side of the ply a dyed latex coating 24. From the front face or side of the sheet, which is the top side illustrated in FIG. 2, the coating is obscured with the recording sheet in its manufactured condition and before use. The application of writing pressure produces compaction of the fibers, and relative transparency, revealing the colored coating on the back side of the sheet.

With the invention it is also possible, of course, to produce a multi-ply construction with a coating of dyed material, for instance, sandwiched between the plies and made distinct with the application of writing pressure.

In the production of the ply of collapsible polyolefin fibers, it is possible to include a certain amount of wood fibers and still retain a capability of transparentization under pressure. Ordinarily, if wood fibers are included in the mat containing the compactible polyolefin fibers, the wood fiber content is best maintained at not more than about 40% by weight of the total fiber content of the mat.

Set forth below are certain examples further illustrating the invention. In the examples, the compactible polyolefin fiber employed was one prepared using an emulsion-type process as above described. The fibers had a surface area as measured by nitrogen absorption of 8 to 10 $m^2$ per gm, an average length of approximately 1 mm, and an average fiber coarseness of 10 decigrex. The fibers had a drainage factor of about 1, and contained about 2% polyvinyl alcohol to facilitate water dispersibility. The fiber was a polyethylene fiber. The polyethylene was of a high density type, having a Melt Index of 8, corresponding to a weight average molecular weight of about 40,000.

EXAMPLE I

A pulp was prepared from the polyolefin fiber and dyed with Heliogen blue A paste (50% concentration, GAF Corporation), using approximately 4 gms of paste per 1,000 gms of pulp. The dye was fixed to the fiber by successive additions of 1 gm of sodium aluminate and 50 gms of sodium chloride per 1,000 gms of pulp followed by adjustment of pH to 5.0 with alum. A wood pulp was prepared of bleached alder kraft, and dyed blue in a similar manner.

A hand sheet having a basis weight of 19.5 gms per $m^2$ was prepared of the polyolefin fiber, in a British hand sheet mold, and couched off the wire onto a blotter. Another hand sheet of the same basis weight was prepared of the wood pulp fiber. The hand sheet of the polyolefin fiber was placed on top of the hand sheet of wood pulp, and the two sheets pressed together by couching on the wire of the hand sheet mold. The two-ply sheet was removed from the hand sheet mold, wet pressed, and dried in a rotary steam dryer. The recording sheet so prepared had a basis weight of about 39 gms per $m^2$. The pressure of a typewriter key applied to the face sheet of a stack of 12 of such sheets produced readable images in all of the sheets.

EXAMPLE II

Recording sheets were prepared having a three-ply construction as illustrated in FIG. 3, and using the hand sheet method outlined in Example I. The face and back plies of the recording sheets were hand sheets of bleached alder kraft pulp, dyed as in Example I, having a basis weight of approximately 8 gms per $m^2$. The center ply of the recording sheets was a hand sheet prepared from dyed polyolefin fiber as described in Example I, having a basis weight of approximately 16 gms per $m^2$. Good imaging resulted in each of the recording sheets of a stack of 8 or more of such sheets subjected through the face sheet in the stack to the pressure of a typewriter key.

EXAMPLE III

Recording sheets were prepared as in Example II, differing only in that the face ply of the recording sheets was prepared from undyed wood pulp. Good imaging was observed in a stack of 8 or more such sheets subjected to the pressure of a typewriter key.

EXAMPLE IV

To increase the adhesion between the plies of a recording sheet and obtain increased resistance to delamination, a bonding additive may be utilized. Thus, hand sheets were prepared as in Example I wherein both the dyed pulp of polyolefin fibers and the pulp of wood fibers were treated with a cooked cationic corn starch (Q-tac 3894, Corn Products Corporation) at 2% pulp consistency. The amount of corn starch used, on a weight basis, was 2½% of the fiber weight of the pulp being treated. Two-ply recording sheets prepared from such pulps, following the procedure, of Example I were prepared. The plies of such sheets could be separated only with partial destruction of the plies. Imaging capability was essentially the same as observed in the sheets of Example I.

EXAMPLE V

Resistance to picking may be incorporated into the recording sheets with size press treatment of the sheets. Thus, a two-ply recording sheet prepared as in Example I was size press treated on a laboratory scale press utilizing the following sizing composition: 85 parts acetylated corn starch (Kofilm 80, National Starch), 15 parts polyvinyl alcohol (Gelvatol 1-60, Monsanto), 5 parts melamine formaldehyde (Paraz 707, American Cyanimid), water (in an amount producing a 30% solids solution). The solution was used in flooding the nip of the press rolls, with a pickup of the composition in the sheets of approximately 2.5 gms per m² resulting. The recording sheet produced had good imaging capability.

EXAMPLE VI

A hand sheet having a basis weight of about 40 gms per m² was prepared from compactible polyolefin fibers utilizing the British hand sheet mold as discussed in Example I. The hand sheet was couched off the wire of the mold onto a blotter and dried. The hand sheet was then coated on its back side with approximately 8 gms per m² of a latex coating to produce a recording sheet. Specifically the coating material used was Dow 620 styrene-butadiene latex (50% solids), dyed with solar violet RML. A stack of 12 sheets so produced showed good imaging in each of the sheets with typewriter key pressure applied.

EXAMPLE VII

Recording sheets were prepared as in Example I, utilizing undyed polyolefin fibers for the preparation of one ply in the sheets, and wood pulp dyed with black dye as the other ply in the sheets. A stack of 12 of such sheets exhibited good imaging in all sheets with typewriter key pressure applied.

Ordinarily, for reasons of economy, the compactible fibers utilized are polyethylene or polypropylene fibers, or copolymers of mixtures thereof. However, polymers of higher series olefins are usable, provided such fibers have a high surface area and are sufficiently flexible to compact under the pressure of a writing instrument with destruction of light-scattering interfaces to produce relative transparency.

In general terms, the number of copies possible from the recording sheets disclosed by this invention depends on impact energy transmission through the stack of sheets. Energy transmission is a function of caliper, basis weight, elastic modulus and/or stiffness. Experimental tests have shown that the number of acceptable copies which can be made can be characterized by the total basis weight of the recording sheet. As shown in Table I, the number of acceptable copies which can be obtained from normal typewriter use decreases as the basis weight increases.

Table I

Effect of Basis Weight (gms/m²) on Number of Acceptable Duplicate Copies

| Basis Wt. Polyolefin Fiber Ply | Basis Wt. Cellulosic Fiber Ply | Total Basis Wt. | Number of Acceptable Copies |
|---|---|---|---|
| 17.8 | 17.8 | 35.6 | Over 12 |
| 17.8 | 26.7 | 44.5 | Over 12 |
| 26.7 | 17.8 | 44.5 | Over 12 |
| 26.7 | 26.7 | 53.4 | 8 |
| 17.8 | 35.6 | 53.4 | 8 |
| 35.6 | 17.8 | 53.4 | 8 |
| 26.7 | 35.6 | 62.3 | 6 |
| 35.6 | 26.7 | 62.3 | 5 |
| 35.6 | 35.6 | 71.2 | 4 |
| 44.5 | 44.5 | 89.0 | 3 |
| 53.4 | 53.4 | 106.8 | 2 |
| 71.2 | 71.2 | 142.4 | 1 |

It is at present envisioned that the copy sheets of the invention optimumly have a basis weight ranging from about 20 to 60 gms per m². Furthermore, and in a recording sheet which is a composite of two or more plies, the basis weight of the polyolefin ply should range from about ⅓ to ⅔ of the basis weight of the composite.

Generally speaking, with sheets produced within these ranges, sufficient flexibility is obtained in the recording sheet as a whole to enable the obtaining of readable copies in a significant number of stacked copy sheets.

When a coating size press treatment is utilized, ordinarily there is retention in the sheet of from 0.01 to 5 gms per m² of sizing material.

In a recording sheet prepared as illustrated in FIG. 1, and as described for instance in Example I, it may be desirable to include in the ply made of wood pulp fibers a stabilizer such as a wet strength resin or glass fibers, to render such ply more insensitive to a change in moisture conditions. The construction illustrated in FIG. 3 has the advantage of being a relatively balanced construction, with optimum resistance to curl under climatic conditions that otherwise would tend to induce the same. The construction shown in FIG. 3 has the further advantage of being more easily printed, as by an offset printing process, when it is desired for instance to produce recording sheets having a letterhead printed thereon.

It is claimed and desired to secure by letters patent:

1. A pressure sensitive recording sheet adapted for imaging under the pressure of a typewriter key or other writing instrument comprising at least a pair of fiber plies disposed with one in front of and normally masking the other, said one fiber ply being composed of polyolefin fibers having a surface area exceeding 1 m² per gm with the relatively large surface area of the fibers in said one ply resulting in light-scattering interfaces rendering said one ply opaque, said polyolefin fibers also being sufficiently flexible to compact under the pressure of a writing instrument with destruction of these light-scattering interfaces, said one ply becoming relatively transparent when subjected to the localized pressure of a writing instrument in the region where pressure is applied by reason of compaction of said fibers in said region, said other of said fiber plies being composed of wood fibers, and a colored medium distributed in said other ply normally obscured by the opacity of said one ply but made distinct by instrument pressure by reason of the relative transparency of said region produced by fiber compaction.

2. The pressure sensitive recording sheet of claim 1, which further comprises a third ply of cellulosic fibers disposed in front of said one ply, said third ply having a basis weight not exceeding about 20 gms per m².

3. The recording sheet of claim 1, wherein colored medium is distributed in said other ply.

4. The pressure sensitive recording sheet of claim 2, wherein said colored medium is distributed in said other ply.

5. The pressure sensitive recording sheet of claim 1, wherein said one ply forms the face of the recording sheet.

6. The pressure sensitive recording sheet of claim 1, wherein said one ply forms a face of the recording sheet, and wherein the sheet has been surface sized with retention in the sheet of from 0.01 to 5 gms per m² of sizing material.

7. A pressure sensitive recording sheet adapted for imaging under the pressure of a typewriter key or other writing instrument, said sheet having a basis weight within the range of about 20 to 60 gms per m², said sheet being a composite of an opaque face ply of polyolefin fibers and a back ply of wood pulp fibers coextensive with and adhered to the face ply, the polyolefin fibers in said face ply having a surface area exceeding 1

$m^2$ per gm with the relatively large surface area of the fibers in said face ply resulting in light-scattering interfaces rendering said face ply opaque, said polyolefin fibers also being sufficiently flexible to compact under the pressure of a writing instrument with destruction of light-scattering interfaces, said face ply becoming relatively transparent when subjected to the localized pressure of a writing instrument in the region where pressure is applied by reason of compaction of said fibers in said region, said face ply having a basis weight ranging from about ⅓ to ⅔ of the basis weight of the recording sheet, and a colored medium distributed in said back ply normally obscured by the opacity of said face ply but made distinct by instrument pressure by reason of the relative transparency produced in said region.

8. The recording sheet of claim 7, wherein the polyolefin is polyethylene.

9. A pressure sensitive recording sheet adapted for imaging under the pressure of a typewriter key or other writing instrument comprising a mat of polyolefin fibers where the fibers in said mat have a surface area exceeding 1 $m^2$ per gm with the relatively large surface area of the fibers in said mat resulting in light-scattering interfaces rendering said mat opaque, said polyolefin fibers also being sufficiently flexible to compact under the pressure of a writing instrument with destruction of the light-scattering interfaces, said mat becoming relatively transparent when subjected to the localized pressure of a writing instrument in the region where pressure is applied by reason of compaction of said fibers in said region, and a colored medium distributed in said recording sheet behind said mat and normally masked by the opacity of said mat but made distinct by instrument pressure by reason of the relative transparency of said region produced by fiber compaction.

* * * * *